United States Patent Office 3,418,304
Patented Dec. 24, 1968

3,418,304
POLYMERIZATION CATALYST
Arthur W. Langer, Jr., Watchung, and John W. Harding, Westfield, N.J., assignors to Esso Research and Engineering Company, a corporation of Delaware
No Drawing. Filed Sept. 13, 1963, Ser. No. 308,675
15 Claims. (Cl. 260—93.7)

ABSTRACT OF THE DISCLOSURE

A polymerization catalyst of improved stereospecificity is formed by combining a reduced transition metal compound (such as $TiCl_3$) with the reaction product of a Lewis acid (such as $AlCl_3$), and an alkyl metal compound which is a weak cocatalyst and which contains nitrogen, oxygen, or sulfur. The catalyst composition is particularly suitable for the polymerization of alpha-olefins having 3 or more carbon atoms.

---

This invention relates to novel stereospecific polymerization catalysts and their use in the polymerization of propylene and higher alpha olefins.

Prior to the present invention, it was found that alpha olefins could be polymerized and copolymerized at low pressures in the presence of various combinations of reducing metals or metal compounds, e.g. alkali and alkaline earth metals, their hydrides and alloys; aluminum hydrides, aluminum alkyls, alkyl aluminum halides, and the like in combination with various heavy metal compounds such as the halides, acetyl acetonates, and the like, of the metals of Group IV through VI and Group VIII of the Periodic System, e.g. of titanium, zirconium, vanadium, chromium, molybdenum and iron. See, e.g. Belgian Patent No. 533,362, "Chemical & Engineering News," Apr. 8, 1957, pages 12 through 16 and "Petroleum Refiner," December 1956, pages 191 through 196.

It is also known that the use of Lewis bases as third components with certain of the above combinations will increase their activity and stereospecificity in the polymerization of propylene and higher alpha olefins. However, Lewis bases, as is shown in the accompanying data, are of no value at all in the present invention.

In this invention, Lewis acids, such as $AlCl_3$, are used to form reaction products or complexes with a specific class of alkyl metal compounds. These complexes in combination with transition metal compounds form catalysts which are highly stereospecific for the polymerization of polypropylene or higher alpha olefins.

More specifically, the complex or reaction product is formed by adding the Lewis acid to the alkyl metal compound in an inert hydrocarbon diluent, such as xylene or heptane, or the components may be mixed in the absence of diluent. About 0.5 to 1.5 moles of Lewis acid is mixed with each mole of alkyl metal compound, although preferably one mole of Lewis acid is used per mole of alkyl metal compound. The temperature of reaction is not critical although it is best to react the materials at about −20° C. to +60° C. The resulting reaction product is then mixed with a partially reduced transition metal compound in a mole ratio of 0.1 to 1 to 5 to 1, preferably 0.2 to 1 to 2 to 1. A catalytic amount of this total composition is then contacted with the monomer. It is desirable to add the complex to the transition metal compound prior to the addition of the monomer.

The Lewis acids (electron pair acceptors) of this invention have the formula $MX_n$, where M is an ion of a metal selected from the group including aluminum, gallium, indium, magnesium and beryllium. These are the most active Group II–A and III–A metals. Further, X is chosen from anions of any of chlorine, bromine, or iodine; and $n$ is equal to the valence of the metal, M. Preferably X is Cl, and M is aluminum. Examples of these Lewis acids include $AlCl_3$, $MgCl_2$, $MgBr_2$, $AlI_3$ and $BeCl_2$. Most preferred is $AlCl_3$.

The alkyl metal compounds of this invention are defined by the following formulas: $R_nMNR'_2$, $R_nMOR'$, $R_nMPR'_2$, and $R_nMSR'$.

M in the above formulas represents the ions of the more active Groups II–A and III–A metals, i.e., the ions of aluminum, gallium, indium, magnesium and beryllium. Preferred is aluminum.

$n$ in the above formulas is an integer which is equal to the valence of M for the Lewis acid, and the valence of M minus one for the alkyl metal.

R and R' in the general formulas above, may be the same or different monovalent hydrocarbon radicals. Examples of suitable R and R' groups include aryl radicals; aliphatic hydrocarbon radicals or derivatives, such as alkyl, cycloalkyl-alkyl, cycloalkenyl-alkyl, aryl-alkyl, cycloalkyl, aryl-cycloalkyl, cycloalkyl-alkenyl, alkyl-aryl or cycloalkyl-aryl radicals.

Specific examples for R and R' groups for substitution in the above formulas include methyl, ethyl, n-propyl, isopropyl, n-butyl, isobutyl, n-amyl, isoamyl, n-hexyl, n-octyl, n-decyl, and the like; 2-butenyl, 2-methyl-2-butenyl and the like; cyclopentyl-methyl, cyclohexyl-ethyl, cyclopentyl-ethyl, methylcyclopentyl-ethyl, 4-cyclohexenylethyl, and the like; 2-phenylethyl, 2-phenylpropyl, α-naphthylethyl, methylnaphthylethyl, and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl, and the like; phenylcyclopentyl, phenylcyclohexyl, the corresponding naphthyl derivatives of cycloalkyl groups, and the like; phenyl, tolyl, xylyl, ethylphenyl, naphthyl, methylnaphthyl, dimethylnaphthyl, ethylnaphthyl, and cyclohexyl-phenyl.

Preferably R is a lower alkyl group having 1–8 carbon atoms such as ethyl and hexyl, and R' is a lower alkyl group having 1–4 carbon atoms such as ethyl and propyl. Ethyl is particularly preferred for R and methyl or ethyl for R'.

Examples of preferred complexes between the Lewis acid and the alkyl metal compound include $Et_2AlNEt_2 \cdot AlCl_3$, $Bu_2AlOMe \cdot AlCl_3$, $BuMgNEt_2 \cdot AlCl_3$, $BuMgNEt_2 \cdot MgBr_2$, and $Et_2AlSMe \cdot AlBr_3$. (In the preceding formulas Et represents an ethyl group, and Bu represents a butyl group.)

The partially reduced transition metal compound of this invention is a partially reduced compound of a metal of Groups IV–B, V–B, VI–B, and VIII. Examples of these metals are titanium, vanadium, chromium, zirconium, tungsten, and molybdenum; titanium is preferred. These may be combined with inorganic groups in the form, for example, of halides, oxides, or hydroxides; or they may be combined with organic groups as for example alcoholates and acetonates. Titanium halides such as $TiX_3$ and $TiX_2$ are most stereospecific, and of these the crystalline forms of $TiCl_3$ and co-crystallized $TiCl_3$–$AlCl_3$ are preferred. The most preferred form is the violet crystalline $TiCl_3$ known as $\alpha TiCl_3$. The reduced transition metal compound may be prepared by methods known in the art (see for example, U.S. Patent No. 3,046,264, issued July 24, 1962).

After the reaction product or complex of the Lewis acid and the alkyl metal compound is formed, this component of the catalyst is mixed with the partially reduced transition metal compound. As a matter of convenience, each component is dispersed in an inert organic diluent which can also serve as the polymerization medium. The catalyst components can also be mixed in situ, i.e. by placing each separate catalyst component in the polymerization reactor which contains an inert organic diluent, allowing the catalyst components to be admixed, and injecting the desirable monomer.

Suitable examples of the inert organic diluent, which should be a liquid at the operating conditions of the polymerization reaction, include aliphatic hydrocarbons such as pentane, hexane, isooctane, and the like; cycloaliphatic hydrocarbons such as cyclopentane, cyclohexane, decahydronaphthalene, and the like; aromatic hydrocarbons such as benzene, toluene, ethylbenzene, xylene, tetrahydronaphthalene, and the like; halogenated aromatic hydrocarbons, e.g. mono- or di-chlorobenzenes, and the like. Although the concentrations of the catalyst components are not critical, sufficient amounts of the diluent are employed such that the concentration of each component is normally in the range of 0.01 to 10 g./l., preferably 0.1 to 5 g./l.

In preparing and using catalysts according to this invention, all steps should preferably be carried out in the absence of oxygen, moisture, carbon dioxide or other harmful impurities. This may be readily accomplished by blanketing all the raw materials, i.e. the catalyst components, monomers, inert diluents, etc., with an inert gas such as dry nitrogen or argon. Electron donors such as amines, mercaptans, ketones, aldehydes, etc. are generally poisonous to the catalyst system and it is generally desirable that the monomer contain less than about 200 p.p.m. and the diluent less than about 50 p.p.m. by weight of these impurities. Preferably all materials are purified, e.g. by drying, distillation, etc. prior to their use.

The polymerization reaction is carried out at a temperature ranging from about $-50°$ C. to about $150°$ C., preferably $20°$ C. to $100°$ C. The monomer is allowed to remain in contact for a period of time ranging from about 0.1 to about 30 hours, preferably 0.3 to 6 hours, during which time more monomer may be added so as to maintain the total pressure at the desired level which may be as low as atmospheric and as high as 5000 p.s.i.g. but preferably is in the range of 5 to 500 p.s.i.g.

The amount of monomer added will, of course, be determined by catalyst activity, reaction time, diluent volume, desired monomer conversion, etc., but may advantageously be in the range of about 10 g. to about 100 g. monomer per g. total catalyst when the reaction is carried out batchwise. Normally it is desirable for good operability to limit the concentration of polymer in the diluent to less than 20 weight percent. If necessary, the polymer concentration may be maintained at or below this level by the addition of more diluent during the polymerization reaction.

At the end of the reaction, the solid polymer is precipitated and deashed with the aid of about 0.2 to 20 volumes of a $C_1$–$C_6$ alcohol such as methyl alcohol, ethyl alcohol, isopropyl alcohol, n-butyl alcohol, and the like. Additionally, chelating agents or acids may be added to solubilize catalyst residues. The precipitated product is then filtered and washed with more alcohol and may then be finished by the addition of suitable stabilizers and inhibitors followed by drying according to methods now well known in the polymer field.

The monomers which are advantageously polymerized by this invention are alpha olefins having at least 3 carbon atoms. While the invention is preferably applied to straight chain monoolefins, and most preferably to polypropylene, the invention is also useful in the polymerization of other kinds of alpha olefins. Additionally the invention may be applied to produce copolymers of these olefins where it has particular usefulness in tailoring the product to meet specific requirements since the catalyst can change the monomer reactivity ratios relative to conventional catalysts. Finally the invention may be advantageously used to produce block copolymers of the above monomers.

Suitable examples of $C_3$ and higher alpha olefins include straight chain monoolefins such as propylene, butene-1, hexene-1, octene-1, decene-1, and the like; branched chain monoolefins such as 3-methyl-1-butene, 3-methyl-1-pentene, 4-methyl-1-pentene, 6-methyl-1-heptene, and the like; diolefins such as butadiene, isoprene, hexadiene-1,5, and the like; styrene, vinyltoluence, and the like, polar monomers such as acrylonitrile, vinyl chloride, ketones, olefin oxides, and the like.

This invention may be more fully understood by reference to the following examples:

EXAMPLE 1

The complex was prepared by mixing 0.26 g. $AlCl_3$ (0.002 mole) with 0.314 g. $Et_2AlNEt_2$ (0.002 mole) in 40 ml. xylene under a dry nitrogen atmosphere at $25°$ C. in a glove box. After 15 minutes, 0.62 g. violet alpha $TiCl_3$ (ball milled 6 days) (0.004 mole) was added and the slurry stirred an additional 5 minutes. The catalyst slurry was then rinsed into a 300 cc. Aminco bomb with 10 ml. xylene and sealed. Cold, liquid propylene (50 g.) was charged to the bomb and the bomb was heated with rocking to $85°$ C. for 2 hours. The heat was turned off and the bomb allowed to cool overnight while rocking.

Polymer was isolated by a standard procedure consisting of the following steps: (1) addition of 2 l. isopropyl alcohol and 5 ml. acetylacetone, (2) blending 10 min. in a high speed laboratory Waring Blendor, (3) filtering, (4) reslurrying the polymer with 0.5 l. boiling isopropyl alcohol, (5) filtering while hot, (6) washing filter cake with acetone, (7) wetting the filter cake with acetone containing 0.8 g./l. inhibitor (2,6-ditertiary-butyl-p-cresol), and (8) vacuum drying at $80°$ C. for 12 hours.

The results are shown in the first column (A) of Table I. The control run in the absence of $AlCl_3$ is shown in column B. High molecular weight polymer possessing high crystallinity, as shown by tensile strength and density, was obtained with the complex activator whereas the con-

TABLE I.—PROPYLENE POLYMERIZATION

[300 ml. Rocking Bomb]

| Run | A | B | C |
|---|---|---|---|
| Catalyst: | | | |
| (a) Additive | $AlCl_3$ | None | HMPA [1] |
| g | 0.26 | | 0.36 |
| (b) Alkyl Metal | $Et_2AlNEt_2$ | $Et_2AlNEt_2$ | $Et_2AlNEt_2$ |
| g | 0.314 | 0.314 | 0.314 |
| (c) $\alpha$-$TiCl_3$, g | 0.62 | 0.62 | 0.62 |
| Mmoles a/b/c | 2/2/4 | 0/2/4 | 2/2/4 |
| Polymerization: | | | |
| Xylene, ml | 50 | 50 | 50 |
| Propylene, g | 50 | 60 | 50 |
| Temp., °C | 85 | 85 | 85 |
| Time, hours | 2 | 2 | 2 |
| Yield, g | 30.8 | 55.9 | 1.7 |
| Properties: | | | |
| Inherent Vis., dl/g | 6.86 | 2.80 | 13.5 |
| Kinsinger Mol.Wt.$\times 10^{-3}$ | 990 | 320 | 2,300 |
| Tensile, 2″/min. (Yield) | 4,170 | 420 | |
| Percent Elong., 2″/min. (Yield) | 15 | 420 | |
| Tensile, 2″/min. (Break) | 3,510 | 390 | |
| Percent Elong., 2″/min. (Break) | 630 | 460 | |
| Density | 0.9022 | 0.8658 | 0.8945 |

[1] Hexamethylphosphoramide.

trol run gave almost completely atactic polymer. Thus, the AlCl₃ converted the non-stereospecific Et₂AlNEt₂ activator into a new structure which is highly stereospecific. This is a surprising result since AlCl₃ is a Lewis acid whereas the prior art additives for increasing stereospecificity of the common alkyl metals, such as R₂AlCl or R₃Al, were Lewis bases. Column C shows a control run using one of the most effective Lewis base additives, hexamethylphosphoramide (HMPA), which caused almost complete loss of activity.

EXAMPLE 2

Et₂Al-guaiacol(o-methoxyphenoxy aluminum diethyl) was prepared by mixing 0.4 molar solutions of guaiacol in xylene with AlEt₃ in xylene and heating for 15 min. at 80° C. The solution was cooled to 25° C. and diluted with xylene to 0.05 molar. The complex with AlCl₃ was prepared in the same manner as described in Example 1 but using 0.42 g. Et₂Al-guaiacol (0.002 mole). The remainder of the catalyst preparation, polymerization and polymer isolation was carried out as in Example 1.

The results are summarized in Table II, column D and a control run in the absence of AlCl₃ is shown in column E. Despite the fact that the control was run a longer time at lower temperature and utilized higher aluminum alkyl concentrations (both conditions favor higher stereospecificity), the complexed catalyst gave significantly higher polymer crystallinity as shown by the higher density and tensile strength.

EXAMPLE 3

The procedure of Example 1 was repeated except that the alkyl metal compound was Et₂AlOEt. The results are shown in Table II (column F) together with a control run in the absence of AlCl₃ (column G). Again a remarkable increase in stereospecificity was obtained using the AlCl₃-complexed catalyst. This result is clearly *not* due to transalkylation between Et₂AlOEt and AlCl₃ because this would yield EtAlCl₂ which is known to produce only atactic polymer. Although complete alkyl exchange to form Et₂AlCl is highly improbable, even this would fail to give the high stereospecificity achieved by the complex of this invention as shown by the Et₂AlCl control run in column H.

beta TiCl₃. The polybutene-1 is of higher crystallinity than the control made in the absence of AlCl₃.

EXAMPLE 6

Following the procedure of Example 3, propylene is polymerized with the following catalyst compositions:

Et₂AlOMe·AlBr₃+gamma TiCl₃
Bu₂AlOMe·AlCl₃+alpha TiCl₃
Et₂AlSMe·AlCl₃+alpha TiCl₃
BuMgNMe₂·AlCl₃+alpha TiCl₃
BuMgNEt₂·MgBr₂+alpha TiCl₃

Improved polymer properties are obtained as a result of higher stereoregularity.

The advantages of this invention will be apparent to the skilled in the art. Novel catalyst systems of high activity and stereospecificity are made available for polymerizing and copolymerizing a wide range of alpha olefins. The polymers thus produced have superior characteristics as regards molecular weight, crystallinity, and mechanical properties.

It is to be understood that this invention is not limited to the specific examples which have been offered merely as illustrations and that modifications may be made without departing from the spirit of the invention.

What is claimed is:

1. A catalyst composition comprising a partially reduced transition metal compound in combination with the reaction product of
    (a) a Lewis acid of the formula $MX_n$, and
    (b) an alkyl metal compound having a formula selected from the class consisting of $R_nMNR'_2$, $R_nMOR'$ and $R_nMSR'$, the mole ratio of Lewis acid to alkyl metal being in the range of about 0.5 to 1.5, where
        (1) R and R' are monovalent hydrocarbon radicals,
        (2) M is selected from the class of Al, Ga, In, Mg and Be,
        (3) X is selected from the class of Cl, Br and I,
        (4) n equals the valence of M for the Lewis acid and the valence of M minus one for the alkyl metal.

2. The composition of claim 1 wherein R is a C₁ to C₈ alkyl group, and R' is a C₁ to C₄ alkyl group.

3. The composition of claim 2 wherein M is aluminum.

TABLE II.—PROPYLENE POLYMERIZATION

[300 ml. Rocking Bomb]

| Run | D | E | F | G | H |
|---|---|---|---|---|---|
| Catalyst: | | | | | |
| (a) Additive | AlCl₃ | None | AlCl₃ | None | None |
| g | 0.26 | | 0.052 | | |
| (b) Alkyl Metal | Et₂Al-quaiacol¹ | Et₂AlOEt | Et₂AlOEt | Et₂AlOEt | Et₂AlCl |
| g | 0.42 | 0.42 | 0.052 | 0.26 | 0.048 |
| (c) α-TiCl₃, g | 0.62 | 0.62 | 0.62 | 0.62 | 0.62 |
| Mmoles a/b/c | 2/2/4 | 0/2/4 | 0.4/0.4/4 | 0/2/4 | 0/0.4/4 |
| Polymerization: | | | | | |
| Xylene, ml | 50 | 50 | 50 | 50 | 50 |
| Propylene, g | 50 | 50 | 50 | 60 | 50 |
| Temp., ° C | 85 | 85 | 85 | 85 | 85 |
| Time, hrs | 2 | ² 1 | 2 | 2 | 2 |
| Yield, g | 50 | 24 | 20 | 54 | 35 |
| Properties: | | | | | |
| Inherent Vis., dl./g | 5.20 | ² 16.0 | 5.21 | 2.35 | 4.32 |
| Kinsinger Mol. Wt.×10⁻³ | 690 | 2,850 | 690 | 255 | 550 |
| Tensile, 2″/min. (Yield) | 4,120 | 3,360 | 3,610 | 716 | 2,530 |
| Percent Elong., 2″/min. (Yield) | 18 | 29 | 21 | 233 | 31 |
| Density | 0.8993 | 0.8925 | 0.8995 | 0.8762 | 0.8933 |

¹ The quaiacol radical = ortho-methoxyphenoxy.
² Polymerization was carried out for 1 hour at 25° C. before heating to 85° C. and was responsible for the high molecular weight.

EXAMPLE 4

When the procedure of Example 1 is followed except that 0.628 g. purple VCl₃ (0.004 mole) is used in place of TiCl₃, the polypropylene is more crystalline than that obtained in the absence of AlCl₃.

EXAMPLE 5

The procedure of Example 1 is repeated for the polymerization of butene-1 using Et₂AlNMe₂·AlCl₃ and brown 4. The composition of claim 3 wherein X is Cl.

5. The composition of claim 1 wherein the partially reduced transition metal compound is TiCl.

6. The composition of claim 4 wherein the partially reduced transition metal compound is α-TiCl₃.

7. A catalyst composition comprising α-TiCl₃ in combination with (ethyl)₂AlN(ethyl)₂·AlCl₃.

8. A process for polymerizing alpha olefins having three or more carbon atoms which comprises contacting the alpha olefin with the catalyst of claim 1.

9. A process for polymerizing alpha olefins having three or more carbon atoms which comprises contacting the alpha olefin with the catalyst of claim 2.

10. A process for polymerizing alpha olefins having three or more carbon atoms which comprises contacting the alpha olefin with the catalyst of claim 3.

11. A process for polymerizing alpha olefins having three or more carbon atoms which comprises contacting the alpha olefin with the catalyst of claim 4.

12. A process for polymerizing alpha olefins having three or more carbon atoms which comprises contacting the alpha olefin with the catalyst of claim 6.

13. A process for polymerizing alpha olefins having three or more carbon atoms which comprises contacting the alpha olefins with the catalyst of claim 7.

14. The process of claim 13 wherein the alpha olefin is propylene.

15. The composition of claim 3 wherein the reduced transition metal compound is crystalline $TiCl_3$ or co-crystallized $TiCl_3$-$AlCl_3$ and the alkyl metal is defined by the formula $R_nMNR'_2$.

References Cited

UNITED STATES PATENTS

| 3,113,115 | 12/1963 | Ziegler | 260—94.9 |
| 3,131,171 | 4/1964 | Calfee | 260—94.9 |
| 3,257,371 | 6/1966 | Maurer | 260—93.7 |
| 3,225,021 | 12/1965 | Erchak | 260—93.7 |
| 3,269,996 | 8/1966 | Langer | 260—93.7 |

FOREIGN PATENTS 785,314  11/1957  Great Britain.

JOSEPH L. SCHOFER, *Primary Examiner.*

M. B. KURTZMAN, *Assistant Examiner.*

U.S. Cl. X.R.

252—429, 430; 260—88.2, 448, 875, 63, 66, 94.3, 88.7, 94.6, 92.8, 94.4, 80, 93.5, 665